(12) United States Patent
Cano Gomez

(10) Patent No.: US 12,234,109 B2
(45) Date of Patent: Feb. 25, 2025

(54) SUPERMARKET BASKET LIFTING-STACKING MACHINE

(71) Applicant: Jose Antonio Cano Gomez, Mora (ES)

(72) Inventor: Jose Antonio Cano Gomez, Mora (ES)

( * ) Notice: Subject to any disclaimer, the term of this patent is extended or adjusted under 35 U.S.C. 154(b) by 0 days.

(21) Appl. No.: 18/281,355

(22) PCT Filed: Mar. 15, 2022

(86) PCT No.: PCT/ES2022/070147
§ 371 (c)(1),
(2) Date: Sep. 11, 2023

(87) PCT Pub. No.: WO2022/195146
PCT Pub. Date: Sep. 22, 2022

(65) Prior Publication Data
US 2024/0148168 A1 May 9, 2024

(30) Foreign Application Priority Data
Mar. 15, 2021 (ES) .................................. 202100031

(51) Int. Cl.
*A47F 10/04* (2006.01)
*B65G 57/16* (2006.01)
*B65G 57/30* (2006.01)

(52) U.S. Cl.
CPC ............ *B65G 57/30* (2013.01); *B65G 57/165* (2013.01); *A47F 10/04* (2013.01)

(58) Field of Classification Search
CPC ...... B65G 57/10; B65G 57/11; B65G 57/302; B65G 61/00; B65G 57/24; B65G 67/08; B65G 1/1378; A47F 9/045; A47F 10/04; A47F 9/04; B62B 3/16; B66F 9/141; B66F 9/07

USPC ......... 414/793.6, 793.7, 791.6, 789.8, 789.3, 414/788.4, 788.1, 788.2, 797.5
See application file for complete search history.

(56) References Cited

U.S. PATENT DOCUMENTS

| | | | | |
|---|---|---|---|---|
| 3,160,292 A | * | 12/1964 | Albrecht | G07F 7/0636 186/52 |
| 3,257,004 A | | 6/1966 | Potrafke | |
| 4,205,934 A | * | 6/1980 | Pantin | B65G 57/24 414/796.2 |

(Continued)

FOREIGN PATENT DOCUMENTS

| EP | 0826331 A2 | 3/1998 |
|---|---|---|
| EP | 2923615 A1 | 9/2015 |

(Continued)

OTHER PUBLICATIONS

Int'l Search Report for PCT/ES2022/070147, dated Jul. 12, 2022.

*Primary Examiner* — Gregory W Adams
(74) *Attorney, Agent, or Firm* — MaxGoLaw PLLC

(57) ABSTRACT

The invention relates to a basket lifting-stacking machine, for lifting baskets by means of a rack-and-pinion lifting system driven by a single-phase self-braking motor so that the customer can lift the basket to the height that best suits their own height, with automatic movement of the basket towards the basket-stacking module, by means of conveyor belts and an electromagnet driven by a linear actuator, and automatic basket stacking with a platform that adapts its height to the number of baskets stacked by means of a scissor lift system driven by a linear actuator with a potentiometer.

3 Claims, 5 Drawing Sheets

(56) References Cited

U.S. PATENT DOCUMENTS

| | | | | |
|---|---|---|---|---|
| 4,658,715 | A * | 4/1987 | Stobb | B65G 57/06 |
| | | | | 414/792.9 |
| 5,174,454 | A * | 12/1992 | Parkander | B65G 1/0407 |
| | | | | 209/552 |
| 5,645,392 | A * | 7/1997 | Leichty | B65G 59/063 |
| | | | | 414/416.01 |
| 6,533,533 | B1 * | 3/2003 | Heston | B65G 57/24 |
| | | | | 414/793.6 |
| 8,066,469 | B2 * | 11/2011 | Trejo | B65G 57/302 |
| | | | | 414/794.7 |
| 8,468,781 | B2 * | 6/2013 | Fritzsche | B65G 57/06 |
| | | | | 53/540 |
| 8,708,637 | B2 * | 4/2014 | Wolkerstorfer | B65G 57/112 |
| | | | | 414/791.6 |
| 9,731,916 | B2 * | 8/2017 | Kollmuss | B65G 65/02 |
| 10,370,199 | B2 * | 8/2019 | Ducharme | B65G 57/035 |
| 2006/0285947 | A1 * | 12/2006 | Hansl | B65G 1/0407 |
| | | | | 414/277 |
| 2009/0288917 | A1 | 11/2009 | Sato | |
| 2014/0308107 | A1 * | 10/2014 | Nickles | B65G 57/302 |
| | | | | 29/418 |

FOREIGN PATENT DOCUMENTS

| | | | |
|---|---|---|---|
| ES | 2394808 | A2 | 2/2013 |
| ES | 2645293 | A1 | 12/2017 |
| FR | 3045025 | A1 | 6/2017 |
| GB | 944782 | A | 12/1963 |
| JP | H07313314 | A | 12/1995 |
| KR | 102224698 | B1 | 3/2021 |
| WO | 2011145995 | A1 | 11/2011 |

\* cited by examiner

SUPERMARKET BASKET LIFTING-STACKING MACHINE

TECHNICAL FIELD

It is known in supermarkets that when unloading the purchase carried in the basket, there are certain types of people (such as elderly people) who have to bend down to pick up the products and put them on the conveyor belt to be charged. On the other hand, these same people may see it as a problem to stack the basket in a column of already stacked baskets, possibly leaving the basket to the side, without stacking, thus creating disarray at the cash registers. The present model solves said problem of those movements that can be difficult for some people by means of a machine that lifts the basket to the height that the customer wishes and once the basket is empty, the customer leaves it behind because the machine will automatically stack the basket in another module, leaving the lifting part free for the next customer.

BACKGROUND OF THE INVENTION

There are similar devices with various drawbacks:
The machine is open, without any type of protection.
The lifting height is fixed, that is, the basket gets into the machine and is always lifted to the same height.
On the other hand, all known machines only lift the basket and the customer then has to remove the basket from the machine and leave it in the correct place.

DESCRIPTION OF THE INVENTION

The device of the invention presents a new system for lifting the supermarket basket to suit the customer, which is achieved using a rack-and-pinion lifting system driven by a self-braking single-phase motor connected to a 3-position rocker button.

With this type of button, the customer will be able to raise and lower the supermarket basket so that it remains in an ideal position.

In addition, the operation of the device is extended since, once the purchase has been unloaded from the supermarket basket, the supermarket basket will be stacked automatically in another part of the device once the customer presses a LED button. The stacked supermarket baskets will receive radiation from a germicidal UV-C LED lamp to disinfect the surface of the supermarket baskets.

DESCRIPTION OF THE DRAWINGS

To complement the following description and for the purpose of helping to better understand the features of the invention, a set of drawings is attached to the present specification on the basis of which figures the innovations and advantages of the device object of the invention will be more readily understood.

PREFERRED EMBODIMENT OF THE INVENTION

Figure 1:
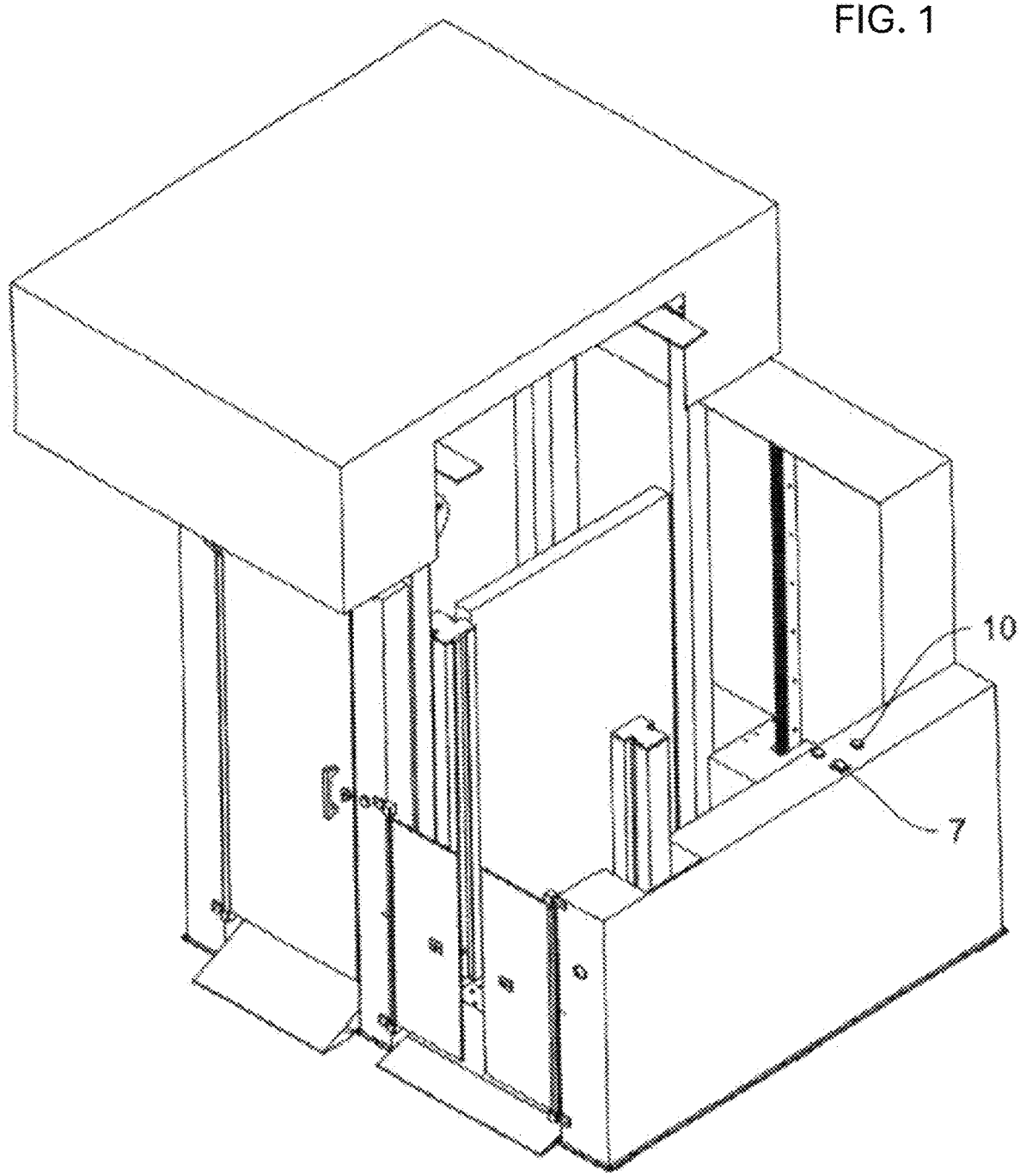
FIG. 1 shows a perspective view of the entire device.
Figure 2:
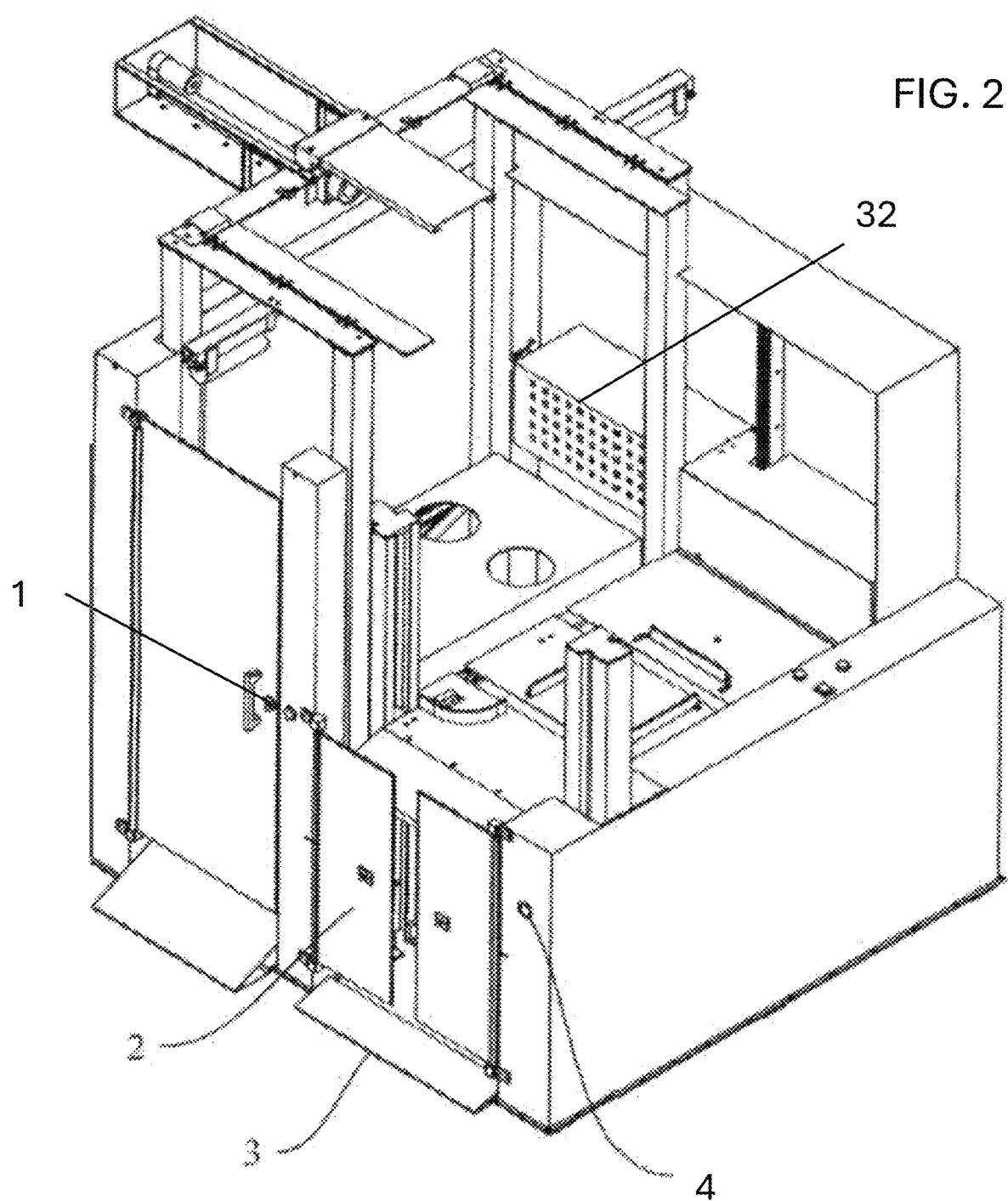
FIG. 2 shows a perspective view of the device with several cover plates removed for a better explanation of the invention.
Figure 3:
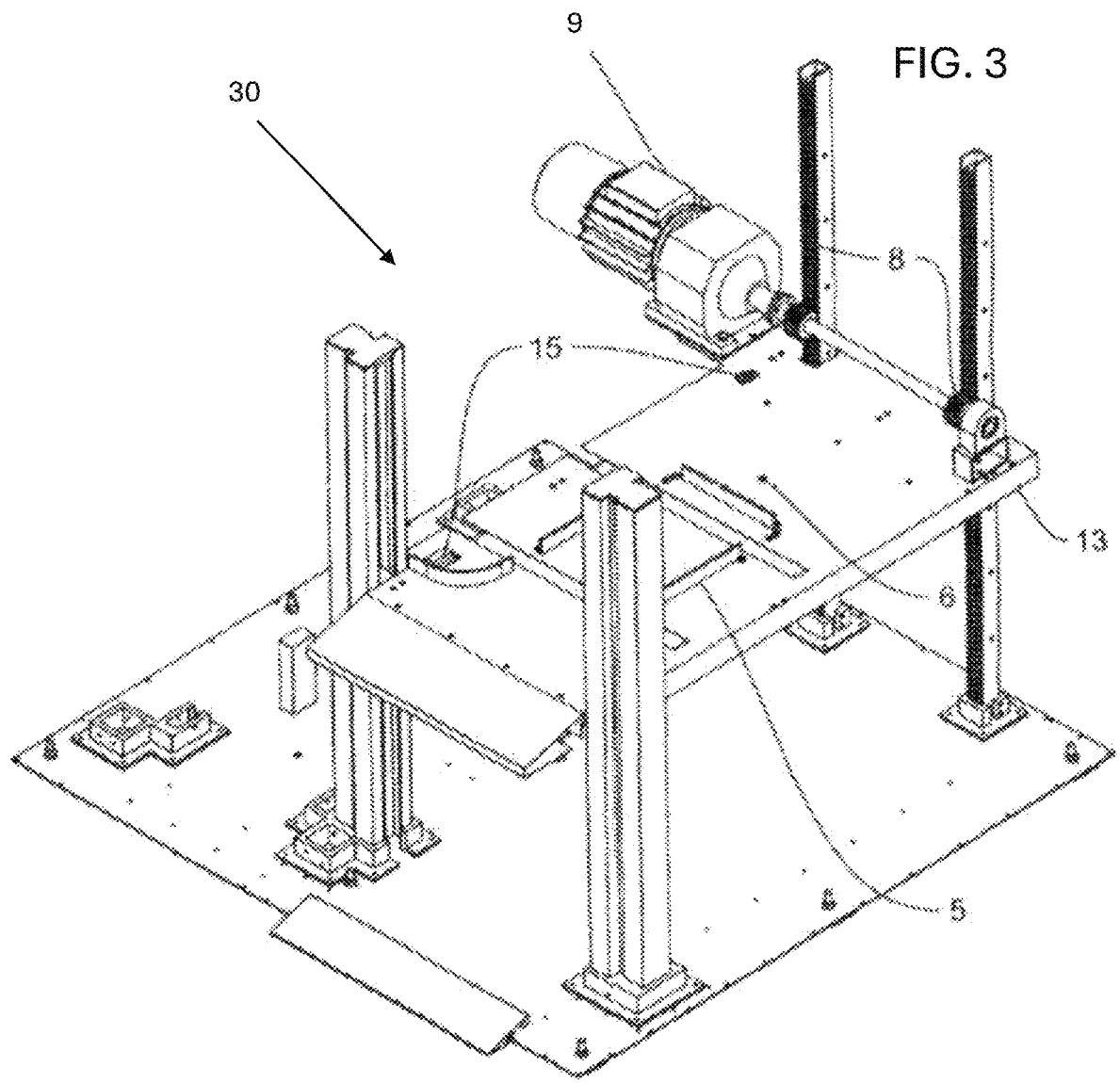
FIG. 3 shows a perspective view of the basket lifting system.
Figure 4:
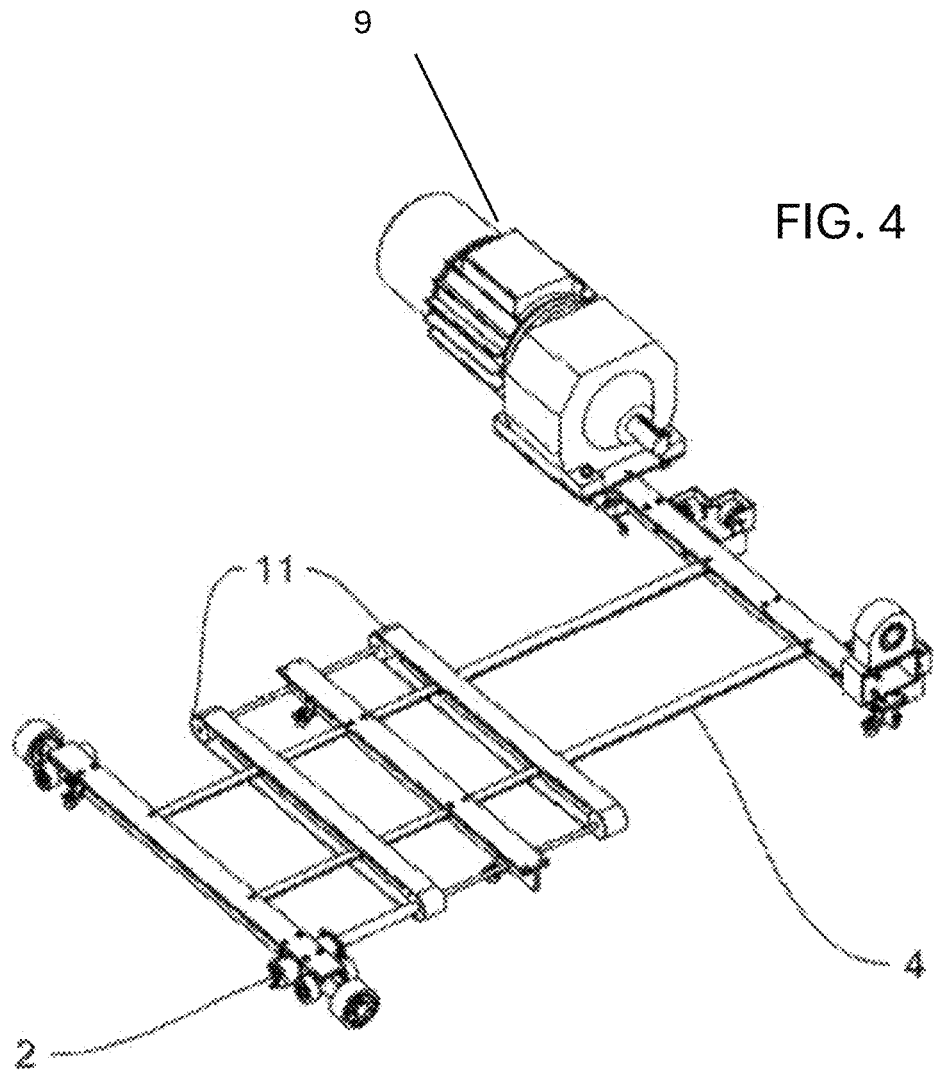
FIG. 4 shows a perspective view of the frame, without the plate.
Figure 5:
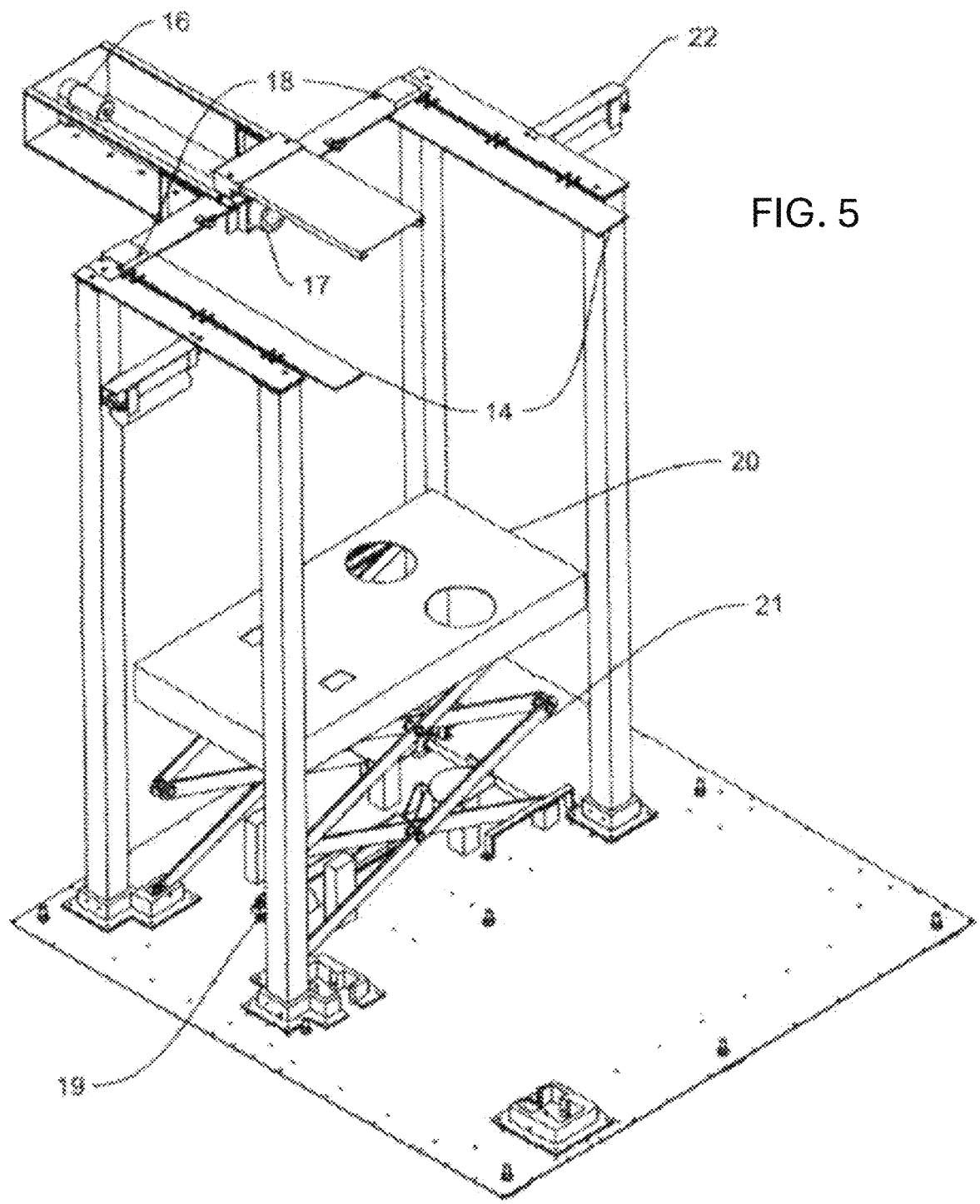
FIG. 5 shows a perspective view of the basket stacking system.

In view of the aforementioned figures, it can be seen how the device is made up of two modules, the part for lifting the supermarket basket and the part for stacking the supermarket baskets.

The customer would arrive with the supermarket basket and at a certain distance the proximity sensor 1 would activate two linear actuators that would open the entrance doors 2.

The supermarket basket would go up the entrance ramp 3 until placing the supermarket supermarket basket on the frame 4.

The supermarket basket will move forward through the frame 4 being guided by parts 5 so that the supermarket basket always remains in the same position, where a PIR sensor 6 would activate the door closing and the frame lifting circuit.

The supermarket basket is lifted when the customer presses a three-position rocker button 7 with which the frame can be lowered or raised at will.

Said lifting is produced by a rack-and-pinion system 8 driven by a self-braking motor 9.

Once the purchase has been unloaded, the customer would activate a LED button 10 and all the automation of the device, that is, the stacking of the basket, would begin.

The supermarket basket is stacked out in a module adjacent to the supermarket basket lifting system 30. In this system 30, there is a germicidal UV-C LED lamp 32 to disinfect the surface of the supermarket baskets as they are stacked. The lateral movement that the basket has to carry out is achieved with the actual frame that lifts the supermarket basket, because it has conveyor belts 11 driven by a geared motor 12, all placed under the plate 13 that covers the frame.

As previously mentioned, once the customer presses the LED button, the geared motor drives the conveyor belts and laterally moves the basket, which will move forward, resting on flat bars 14.

The passage of the wheels of the basket will be detected with a laser emitter-receiver module 15, whereby stopping the movement of the conveyor belts, activating the lowering of the frame so that the device is ready to receive another basket and activating a linear actuator 16 and an electromagnet 17 that would be moved by said actuator.

This electromagnet in the forward movement of the linear actuator will grab the supermarket basket (due to a metal plate that would have to be placed on the left side of the baskets) and move it backwards.

The supermarket basket will come to a stop and another laser emitter-receiver module 18 will detect it and deactivate the electromagnet (so that it releases the basket) and activate another linear actuator 19.

This linear actuator is responsible for lifting and lowering the stacking platform 20 by means of a scissor system 21.

This platform has cutouts so that the wheels of the supermarket basket can be inserted into them, and the basket will therefore always remain in the same position and other supermarket baskets can be stacked without collisions.

The platform has to rise until the wheels enter said cutouts.

When the platform is at that height, two linear actuators 22 that are supporting the flat bars where the supermarket basket is resting are activated; therefore, the supermarket basket would already be resting on the platform and the platform can start to be lowered.

The height that it has to be lowered would be enough so that when the next supermarket basket moves laterally, there are no collisions. Once the linear actuator lowers the platform, the two linear actuators will be activated for the plungers to be pulled and the flat bars (where the baskets rest) to return to the initial position.

In this way, the supermarket basket would already be stacked and ready to receive another new supermarket basket.

The invention claimed is:

1. A basket lifting-stacking machine comprising two contiguous bodies or modules, a first lifting module with a shape and dimension suitable for containing therein a supermarket basket, open at the top, front and on the side adjacent to the second module, adapted for lifting and lowering of the supermarket basket located therein by means of a frame that can move in the vertical plane by means of a rack-and-pinion transmission system equipped with an electric motor driven by means of a presence or movement sensor, and a second body or stacking module, adjacent to the first module or lifting module, with a shape and dimension suitable for the vertical stacking therein of several units of supermarket baskets, open on the side adjacent to the first module or lifting module, characterized in that the frame of the lifting module comprises a transmission system by means of an electric motor and the use of conveyor belts which, by means of an automated process started by the manual activation of a button, allows the movement of the supermarket basket in the horizontal plane up to the adjacent stacking module, horizontally moving the basket located on the frame or lifting platform to leave the basket supported on a vertical support system by flat bars, fixed to the upper part of the stacking module, from which the supermarket basket is picked up by a platform located inside the stacking module that can be lifted vertically by means of a scissor system transmission and characterized in that the lifting module has access doors, located at the front of the module, which remain closed and, by means of a proximity sensor, detect the approach of the supermarket basket to the module lift and activate the opening of the doors for the access of the supermarket basket to the frame or lifting platform, detecting the entrance of the basket on the platform and activating the closing of the access doors.

2. A basket lifting-stacking machine comprising two contiguous bodies or modules, a first lifting module with a shape and dimension suitable for containing therein a supermarket basket, open at the top, front and on the side adjacent to the second module, adapted for lifting and lowering of the supermarket basket located therein by means of a frame that can move in the vertical plane by means of a rack-and-pinion transmission system equipped with an electric motor driven by means of a presence or movement sensor, and a second body or stacking module, adjacent to the first module or lifting module, with a shape and dimension suitable for the vertical stacking therein of several units of supermarket baskets, open on the side adjacent to the first module or lifting module, characterized in that the frame of the lifting module comprises a transmission system by means of an electric motor and the use of conveyor belts which, by means of an automated process started by the manual activation of a button, allows the movement of the supermarket basket in the horizontal plane up to the adjacent stacking module, horizontally moving the supermarket basket located on the frame or lifting platform to leave the basket supported on a vertical support system by flat bars, fixed to the upper part of the stacking module, from which the supermarket basket is picked up by a platform located inside the stacking module that can be lifted vertically by means of a scissor system transmission and characterized in that it comprises a button with several positions and manual operation by the user, which activates the vertical transmission system of the frame or lifting platform for raising or lowering the supermarket basket, which allows the lifting or lowering of the supermarket basket to the height desired by the user.

3. A basket lifting-stacking machine comprising two contiguous bodies or modules, a first lifting module with a shape and dimension suitable for containing therein a supermarket basket, open at the top, front and on the side adjacent to the second module, adapted for lifting and lowering of the supermarket basket located therein by means of a frame that can move in the vertical plane by means of a rack-and-pinion transmission system equipped with an electric motor driven by means of a presence or movement sensor, and a second body or stacking module, adjacent to the first module or lifting module, with a shape and dimension suitable for the vertical stacking therein of several units of supermarket baskets, open on the side adjacent to the first module or lifting module, characterized in that the frame of the lifting module comprises a transmission system by means of an electric motor and the use of conveyor belts which, by means of an automated process started by the manual activation of a button, allows the movement of the supermarket basket 15 in the horizontal plane up to the adjacent stacking module, horizontally moving the basket located on the frame or lifting platform to leave the basket supported on a vertical support system by flat bars, fixed to the upper part of the stacking module, from which the basket is picked up by a platform located inside the stacking module that can be lifted vertically by means of a scissor system transmission and comprising a germicidal ultraviolet light lamp located inside the stacking module that irradiates light beams onto the surface of the supermarket baskets stacked inside the stacking module.

* * * * *